United States Patent
Kapinos et al.

(10) Patent No.: US 12,367,299 B2
(45) Date of Patent: Jul. 22, 2025

(54) METHODS, SYSTEMS, AND PROGRAM PRODUCTS FOR SECURELY BLOCKING ACCESS TO SYSTEM OPERATIONS AND DATA

(71) Applicant: Lenovo (Singapore) Pte. Ltd., New Tech Park, NC (US)

(72) Inventors: Robert J. Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 294 days.

(21) Appl. No.: 17/863,095

(22) Filed: Jul. 12, 2022

(65) Prior Publication Data

US 2024/0020395 A1    Jan. 18, 2024

(51) Int. Cl.
*G06F 21/62* (2013.01)

(52) U.S. Cl.
CPC .................... *G06F 21/62* (2013.01)

(58) Field of Classification Search
CPC ....... G06F 21/572; G06F 21/575; G06F 21/62
See application file for complete search history.

(56) References Cited

U.S. PATENT DOCUMENTS

| | | | | |
|---|---|---|---|---|
| 7,860,097 B1 * | 12/2010 | Lovett | .......... | H04L 49/357 370/422 |
| 11,531,760 B1 * | 12/2022 | Righi | .......... | G06F 21/85 |
| 2005/0235135 A1 * | 10/2005 | Dao | .......... | G06F 21/85 713/1 |
| 2009/0327684 A1 * | 12/2009 | Zimmer | .......... | G06F 21/575 713/2 |
| 2016/0202964 A1 * | 7/2016 | Butcher | .......... | G06F 8/654 717/172 |
| 2016/0241398 A1 * | 8/2016 | Lewis | .......... | H04L 9/3231 |
| 2017/0109235 A1 * | 4/2017 | Hung | .......... | G06F 11/1451 |
| 2017/0286086 A1 * | 10/2017 | Narasimhan | .......... | G06F 8/654 |
| 2019/0243634 A1 * | 8/2019 | Lewis | .......... | G06F 8/654 |
| 2020/0082090 A1 * | 3/2020 | Samuel | .......... | G06F 8/654 |
| 2020/0310774 A1 * | 10/2020 | Zhu | .......... | G06F 9/4401 |
| 2020/0310824 A1 * | 10/2020 | Atta | .......... | H04L 9/3247 |

(Continued)

FOREIGN PATENT DOCUMENTS

WO    WO-2021221602 A1 *  11/2021

OTHER PUBLICATIONS

Cooper, David, et al. "BIOS protection guidelines." NIST Special Publication 800.2011 (2011): 147. (Year: 2011).*

(Continued)

*Primary Examiner* — Michael Simitoski
(74) *Attorney, Agent, or Firm* — Kunzler Bean & Adamson

(57) ABSTRACT

Methods, systems, and program products are disclosed for blocking input/output (I/O) access to a computing system. A method includes establishing a portion of the machine-readable instructions as sole controller of the system responsive to the machine-readable instructions and preventing unauthorized replacement of the machine-readable instructions. The method also includes blocking user access to internal resources of the computing system and preventing predefined input/output (I/O) of the computing system.

20 Claims, 4 Drawing Sheets

(56) References Cited

U.S. PATENT DOCUMENTS

| | | | |
|---|---|---|---|
| 2021/0232384 A1* | 7/2021 | Lewis | G06F 21/572 |
| 2021/0240489 A1* | 8/2021 | Xie | G06F 21/572 |
| 2021/0240831 A1* | 8/2021 | Oncale | G06F 8/65 |
| 2022/0050671 A1* | 2/2022 | Samuel | G06F 8/65 |
| 2022/0292203 A1* | 9/2022 | Severns-Williams | G06F 21/57 |
| 2022/0334825 A1* | 10/2022 | Swirydczuk | G06F 8/71 |
| 2023/0083979 A1* | 3/2023 | Mitchell | G06Q 10/0837 726/26 |
| 2024/0193309 A1* | 6/2024 | Wagner | H04L 9/0869 |

OTHER PUBLICATIONS

Yao, Jiewen, and Vincent Zimmer. "A Tour Beyond BIOS-Capsule Update and Recovery in EDK II." Intel whitepaper (2016). (Year: 2016).*

Yao, Jiewen, and Vincent Zimmer. "Building secure firmware." Apress: New York, NY, USA (2020): 18-48. (Year: 2020).*

* cited by examiner

METHODS, SYSTEMS, AND PROGRAM PRODUCTS FOR SECURELY BLOCKING ACCESS TO SYSTEM OPERATIONS AND DATA

FIELD

The subject matter disclosed herein relates to a securing data and more particularly to securing data permanently or temporarily.

BACKGROUND

Firmware refers to processor operating instructions that are stored in a memory device, and which are used to control the start-up or "booting" of a processor. The Unified Extensible Firmware Interface (UEFI) is a firmware specification for operating system (OS) compatibility with firmware. While UEFI provides an improvement over the Basic Input/Output System (BIOS) firmware that preceded UEFI, it still suffers from numerous shortcomings.

BRIEF SUMMARY

Methods, systems, and program products are disclosed for blocking input/output access to a computing system. A method, in one embodiment, includes establishing a portion of the machine-readable instructions as sole controller of the system responsive to the machine-readable instructions and preventing unauthorized replacement of the machine-readable instructions. The method also includes blocking user access to internal resources of the computing system and preventing predefined input/output (I/O) of the computing system.

A system, in one embodiment, includes: a processor; and storage device configured to store machine-readable instructions, wherein execution of the machine-readable instructions that, when executed by the processor, cause the processor to establish a portion of the machine-readable instructions as sole controller of the system responsive to the machine-readable instructions and prevent unauthorized replacement of the machine-readable instructions. The processor is also caused to block user access to internal resources of the computing system and prevent predefined input/output (I/O) of the computing system.

A non-transitory computer-readable medium storing machine-readable instructions that, when executed by a processor, in one embodiment, cause the processor to establish a portion of the machine-readable instructions as sole controller of the system responsive to the machine-readable instructions and prevent unauthorized replacement of the machine-readable instructions. The processor is also caused to block user access to internal resources of the computing system and prevent predefined input/output (I/O) of the computing system. receive a special capsule ROM having a payload at a computing system housing the processor; load the special capsule ROM to a scratchpad area; perform a hard restart of the computing system; flash the special capsule ROM into the computing system; execute the payload; and block predefined I/O access to the computing system responsive to the executed payload.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail using the accompanying drawings, in which.

DETAILED DESCRIPTION

Figure 1:
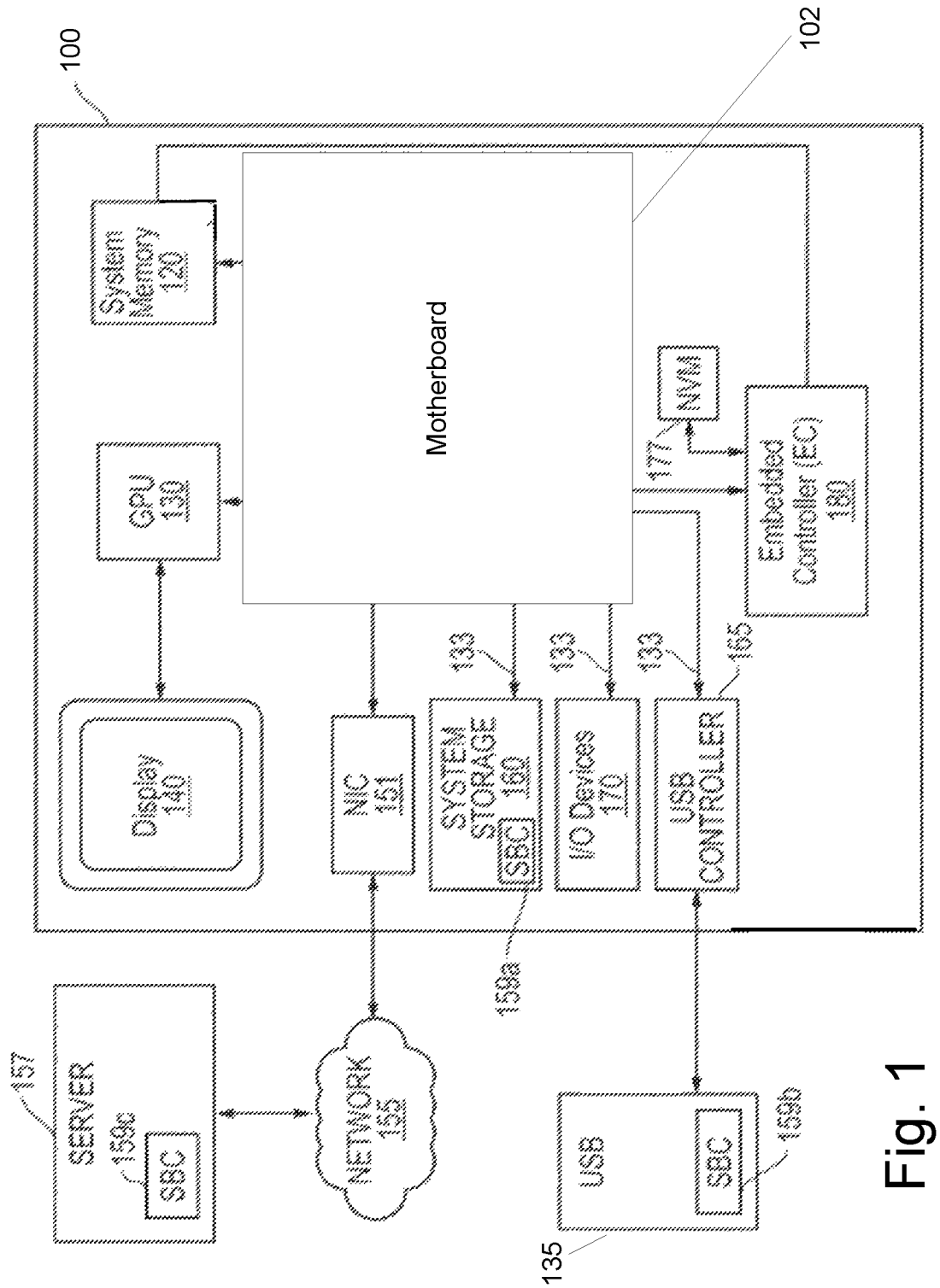
FIG. 1 is a schematic block diagram illustrating one embodiment of a system for receiving lockdown and recovery content.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an electrically erasable programmable read-only memory (EEPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PUP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The apparatuses, methods, systems, program products, and their respective embodiments disclosed herein facilitate securing a system from tampering. The description of elements in each figure may refer to elements of proceeding figures. Like numbers refer to like elements in all figures, including alternate embodiments of like elements.

FIG. 1 is a block diagram of a computer system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of computer systems. It should be further understood that while certain components of a computer system are shown in FIG. 1 for illustrating embodiments of the present disclosure, the computer system is not restricted to including only those components shown in FIG. 1 and described below.

Figure 2:
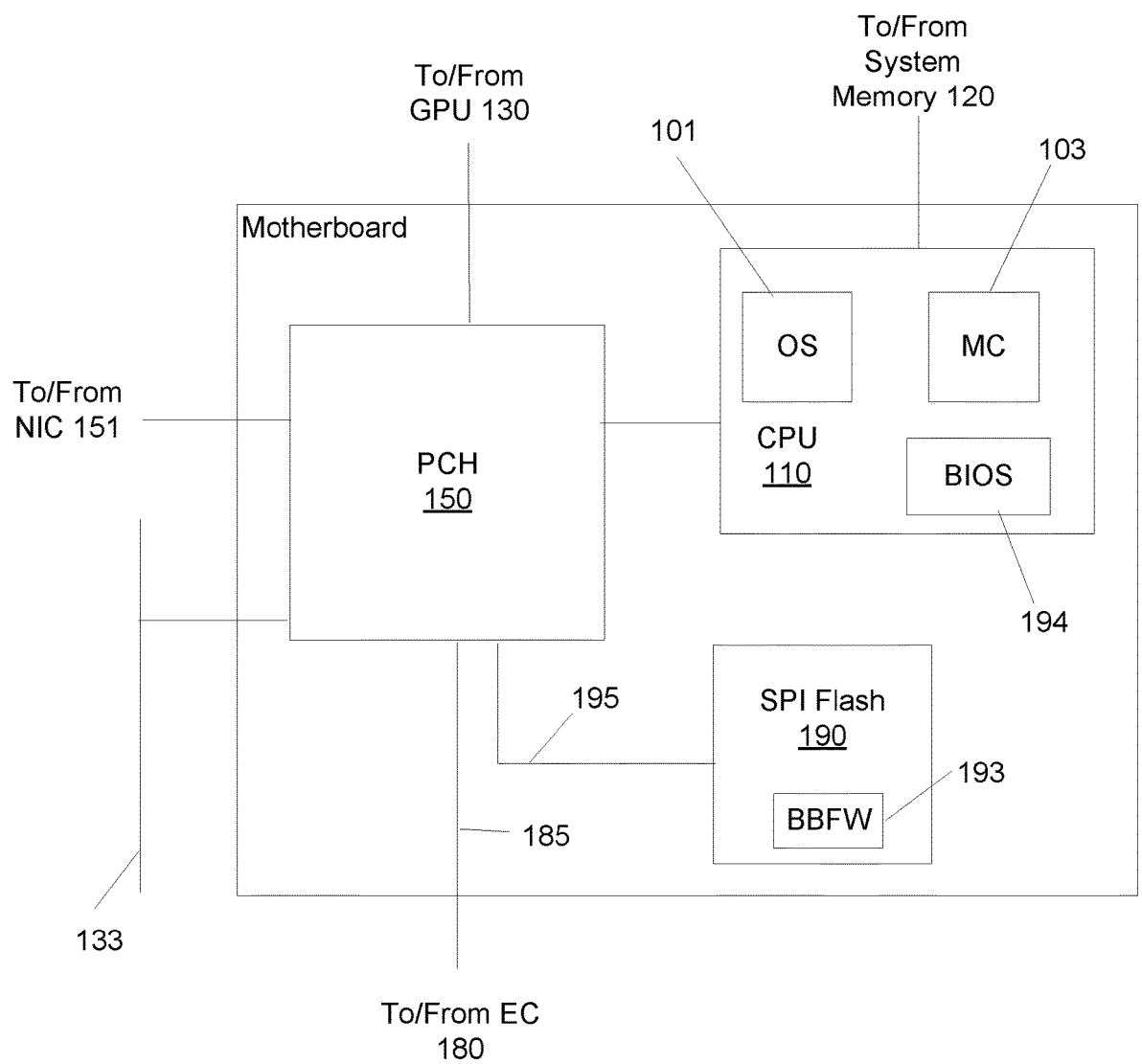
FIG. 2 is a schematic block diagram illustrating components of the system of FIG. 1.

As shown in FIGS. 1 and 2, the computer system 100 may generally include one or more host programmable integrated circuits, such as a central processing unit (CPU) 110 located on a motherboard 102, for executing an operating system (OS) 101, etc. The CPU 110 may also be configured to access a serial peripheral interface (SPI) flash memory device 190 to load and boot a basic input/output system (BIOS) 194 (e.g., UEFI) from base BIOS firmware (BBFW) 193 as shown. SPI flash memory device 190 may be a non-volatile storage device.

The CPU 110 may include any type of processing device, such as an Intel Pentium series processor, an Advanced Micro Devices (AMD) processor or another processing device. The CPU 110 is coupled to system volatile memory 120, which may include, for example, random access memory (RAM), dynamic RAM (DRAM), synchronous DRAM (SDRAM). In one exemplary embodiment, system memory may be DRAM that is configured as dual in-line memory modules (DIMMs), and memory controller (MC) 103 may be present in the CPU 110 for managing the flow of data between the CPU 110 and system volatile memory 120.

In some embodiments, the computer system 100 may include other types of processing devices including, but not limited to, a graphics processor unit (GPU) 130, a graphics-derivative processor (such as a physics/gaming processor), a digital signal processor (DSP), etc. Although the GPU 130 is shown as a separate processing device in the embodiment of FIG. 1, GPU 130 may be omitted in other embodiments, when the functionality provided thereby is integrated within the CPU 110 in a system-on-chip (SoC) design. In FIG. 1, a display device 140 (e.g., LCD display or other suitable display device) is coupled to the GPU 130 to provide visual images (e.g., a graphical user interface, static images and/or video content) to the user. The GPU 130 is, in turn, coupled to the CPU 110 via a platform controller hub (PCH) 150.

The PCH 150 controls certain data paths and manages information flow between components of the computer system. As such, the PCH 150 may include one or more integrated controllers or interfaces for controlling the data paths connecting the PCH 150 with the CPU 110, the GPU 130, system storage 160, input/output (I/O) devices 170, an embedded controller (EC) 180, an EC non-volatile memory (NVM) storage device 177 (e.g., NVRAM, flash memory, etc.), and the SPI flash memory device 190 where the base BIOS firmware image (e.g., BBFW 193) is stored. In one embodiment, PCH 150 may include an SPI controller and an enhanced SPI (eSPI) controller. In some embodiments, the PCH 150 may include one or more additional integrated controllers or interfaces such as, but not limited to, a peripheral controller interconnect (PCI) controller, a PCI-express (PCIe) controller, a low pin count (LPC) controller, a small computer serial interface (SCSI), an industry standard architecture (ISA) interface, an inter-integrated circuit interface, a Universal Serial Bus (USB) interface, or other comparable interfaces.

Local system storage 160 (e.g., one or more media drives, such as hard disk drives, optical drives, NVRAM, Flash memory, solid state drives (SSDs), or any other suitable form of internal or external storage) is coupled to the PCH 150 to provide permanent storage for the computer system 100. The I/O devices 170 (e.g., a keyboard, mouse, touchpad, touchscreen, etc.) are coupled to the PCH 150 to enable the user to interact with the computer system 100, and to interact with application programs or other software/firmware executing thereon.

The EC 180 is coupled to the PCH 150 and may be configured to perform functions such as power/thermal system management, etc. The EC 180 may also be configured to execute program instructions to boot the computer system 100, load application firmware from the SPI flash memory device 190 into internal memory, launch the application firmware, etc. In one example, the EC 180 may include a processing device for executing program instructions to perform the above stated functions. Although not strictly limited to such, a processing device of the EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIGS. 1 and 2, the EC 180 is coupled to the PCH 150 via a data bus 185, and the SPI flash memory device 190 is coupled to the PCH 150 via a data bus 195. According to one embodiment, the data bus 195 is an SPI bus, and the data bus 185 is an eSPI bus. The SPI flash memory device 190 is a shared flash memory device, which is connected to the PCH 150 and the EC 180. In such a configuration, the PCH 150 provides the EC 180 shared access to the SPI flash memory device 190 via the eSPI bus 185, the SPI bus 195, and various interface and logic blocks included within the PCH 150. One or more of the same or additional data communication bus(es) 133 may be present to provide data communications through the PCH 150 to and from system storage 160, the I/O devices 170, and an external USB flash drive 135 via a USB controller 165.

As shown in FIG. 2, the BBFW 193 may be stored on the SPI flash memory device 190. As further shown, additional and separate supplemental BIOS components (SBC) 159 may be stored separately from base BIOS firmware 193 on non-volatile storage device/s that are external to (i.e., non-integrated with) the computer system 100. As just an example, in the embodiment of FIG. 1, separate supplemental BIOS component/s 159a are shown stored on the system storage 160 (e.g., hard disk drive, solid-state drive, etc.), separate BIOS components 159b are shown stored on the USB flash drive 135, and separate supplemental BIOS component(s) 159c are shown stored on non-volatile storage of a remote computer system (e.g., such as a web server 157) that is accessed across a network 155 (e.g., Internet (public), corporate intranet (private)) via a network interface controller (NIC) 151. It will be understood that only one storage source of separate BIOS components may be coupled to the computer system 100, although multiple such sources may also be provided.

In one embodiment, base BIOS firmware (i.e., capsule ROM) loaded onto the SPI flash memory device 190 may subvert an existing capsule ROM and back level prevention processes and only allow a new capsule ROM from a known source to be installed into the system 100.

In various embodiments, a user, such as an authorized technician, determines a level of lockdown desired for the system 100. Then, lockdown capsule files (a special (locking) capsule ROM and a recovery capsule ROM) are prepared on the remote server 157 or on some other system remote from the system 100. The capsule files may be entered into the system 100 through various means/sources, such as, without limitation, the network 155, hard media (e.g., the USB 135), or other comparable means. If the lockdown capsules files are prepared at the remote server 157, then they are sent to the system 100 over the network 155. If the lockdown capsules files are prepared on the remote system, then they are delivered via a storage medium, such as, without limitation, a USB flash drive. The capsule ROM comes from the manufacturer of the system 100 and includes security features inherent to processing of the capsule ROM.

The special capsule ROM is prepared with the characteristic or a payload that blocks all system I/O access except for loading of a second specially prepared (recovery) capsule ROM from a previously specified I/O access port of the computer 100.

In various embodiments, the payload causes the system 100 to refuse to load the OS 101 from internal storage, boot an OS from any external port, or allow access to any data stored within the system 100. The system 100 will not turn on unless, after going through a hard restart, the system 100 finds the recovery capsule ROM at the previously specified I/O access port. Once the system 100 finds the recovery capsule ROM, the system 100 returns to normal operations. If the system 100 does not find the recovery capsule ROM, the system 100 turns off.

In various embodiments, the capsule ROM files include payload+signatures+possibly other validation items, such as, without limitation, cyclic redundancy code (CRC), machine parameters, and/or certificates. The payload is working firmware code. The firmware code can be any runnable unified extensible firmware interface (UEFI)/ BIOS. The firmware code (payload of the special capsule ROM) prevents any ports from being used except the firmware code in the recovery capsule ROM located at the previously specified port. The bootstrap code (code to read in a file from an I/O port) can be built-in or part of the payload firmware in different embodiments. The capsule ROM may be stored on any storage medium of or accessible by the system 100. If the capsule ROM is a recovery ROM file, the recovery capsule ROM is loaded into scratchpad memory of the system 100 using firmware or an external program.

After the system 100 reboots/restarts, the payload in the capsule ROM is validated by system internal code (i.e., bootstrap code) using the validation items. The validation items include capsule security features plus any original equipment manufacturer (OEM) specific security features. For one example, the ROM payload contains check data in the capsule structures defined by UEFI or the payload cannot be accepted by the system. In another example, in an OEM additional check the OEM factory embeds a system specific public key into the system that matches a private key signature in the ROM file along with the payload. If the validation passes, the working code in the capsule ROM file is identified as a validated payload and updating of the system 100 to the new firmware working code can proceed. If the validation fails, the payload is an invalid payload and is discarded. The working codes is one of the defined fields in a capsule payload. The working code (i.e., firmware image) replaces the extant UEFI firmware during the capsule flash process.

A special program (i.e., firmware flash) is used to load the capsule ROM into the system 100. The special program is used to update UEFI firmware. Updating UEFI/BIOS is extremely well known in the art and no further explanation is necessary for a person of ordinary skill in the art to understand disclosed subject matter. The special program depends on the kind and version of the storage device used in the system 100 and the OS running. The storage device might be a serial peripheral interface (SPI) part, an EEPROM, or NVRAM. The special program is stored on any storage medium and saved in some access-controlled database. Access to retrieve a matching recovery ROM is limited to OEM technicians with need. The access could be through any convenient file transmittal protocol such as file transfer protocol (FTP), WGET, hypertext transfer protocol (HTTP), or hard media.

The system 100 decides whether the received firmware (payload) is associated with a recovery capsule ROM using information that is part of the capsule ROM or hard wired into the system 100. The recovery capsule ROM must have a payload that matches what the system 100 expects in terms of size, format, and security details. The system 100 can check those parameters and accept or reject the capsule ROM entirely. The system 100 knows information like the size and layout of the memory it writes to, the expected internal structure of a capsule rom as defined by UEFI, and the authentication and encryption keys stored in the system 100. These should match the recovery payload. If something doesn't match this information, the capsule ROM is automatically rejected. Because control of the recovery capsule ROM is separate from the system 100, use and modification of the system software can be prevented. Thus, undoing of the lockdown of I/O access performed according to the special capsule ROM payload can be securely controlled.

In some embodiments, the recovery capsule ROM is created when the system 100 is made and contains a matching random key to a first (original system) capsule ROM. Only the originally created recovery capsule ROM can be used to restore the system 100.

In some embodiments, the recovery capsule ROM includes ROM parameters or a copy of the original system ROM so that unity of the original system is preserved. The ROM parameters fall into several categories. The categories include system individualization items (e.g., serial number, UUID), factory programmed items (e.g., Windows license, certificates stored in BIOS, and TPM seeds), and user made UEFI settings. The recovery capsule ROM includes code that can restore the system 100 to normal operation by loading an ordinary capsule ROM. Once the ordinary capsule ROM is loaded, an ordinary capsule update is put onto the system 100 and functions are restored.

In some embodiments, the recovery capsule ROM is only a copy of the original system capsule ROM. The first original system capsule ROM manipulates its own version number in real time to defeat back level protection. Anti-rollback is chosen for protecting against rollback attacks. The way this works is no lower version of firmware can be installed over a higher level one. For example, if the system has the BIOS 10, the BIOS 8 could never be installed. This is enforced in the capsule flash program and is one of the validation checks done after the system reboots.

In various embodiments, the special capsule ROM or locking BIOS is stored outside the system 100 with a very high version number, and when the system 100 boots in lockdown mode the BIOS manipulates its version as presented to the capsule program to be very low. Thus, in various embodiments, the special capsule ROM or locking BIOS presents a higher version than every existing BIOS since a time of ROM creation it was not known what version level a system is currently at. Future higher BIOS can be created after the locking capsule ROM is created. The locking capsule ROM, when it is in the system, must be replaced by an essentially unknown BIOS level to restore the system 100. If the system 100 started with the highest level, and our locking capsule ROM is a higher level, there is no way to ever get that highest level back.

For example, a production BIOS might have version 1.13 embedded in it. The lockdown BIOS might have version 999.99 embedded in it. When the flash program loads the image into the system, the versions are compared for back-level prevention. Since 999.99>1.13 lockdown ROM will load. When the system hard reboots and checks the lockdown capsule, 999.99>1.13, therefore the lockdown flash can proceed. When the system hard boots to read the special I/O port, the lockdown firmware modifies the memory resident version of the running ROM to be 0.01 before the I/O port is read. Since 0.01 is lower than any version that might be found, any current version can be loaded into the system.

In various embodiments, validation of the recovery capsule ROM is done by capsule checks and/or secondary checks by the working firmware prior to rebooting to capsule flash mode, when saving parts when the system 100 is locked down. Also, the recovery capsule ROM payload is authenticated.

In various embodiments, all capsule ROMs go through the same validation process. One important security principle is that no capsule payload can ever change the capsule loading and validation code. Capsule firmware can add features that operate on the boot before the capsule update but does not code change the capsule process.

In various embodiments, the system 100 includes port(s) for receiving capsule ROM. The ports for the system 100 may include a dedicated debug port, a general purpose I/O port, such as USB, thunderbolt, or a hard media access device, such as a CD-ROM or floppy disc. any of these orts may be previously designated for receiving the recovery capsule ROM.

The firmware flash program can check the following items, but is not limited to checking only these items:
File for size and internal structure
Payload version
The file for compatibility with the target flash part
Digital signatures of the file and its contents
After the ROM file is copied to the scratchpad ROM, the system can check the ROM contents are valis in terms of size, format, completeness of flash process
After rebooting, the capsule flash program will check (both for lockdown and recovery)
The size and format of the flash payload
Versions of the flash payload for rollback prevention
Included digital signatures and hashes
On finding a recovery ROM, our special firmware will check
File for size and internal structure
The file for compatibility with the target flash part
Payload details (e.g., is it a recovery file and not a lockdown file)
Included digital signatures and hashes against the payload
System matching information saved at manufacturing time or at lockdown time In various embodiments, the lockdown capsule file (i.e., lockdown UEFI firmware) subverts the capsule flash process to place the system into a specified state under sole control of the capsule file. The lockdown UEFI firmware replaces the main UEFI firmware program in the system. By doing so, execution of other programs that could control the system is prevented. The lockdown UEFI firmware prevents code on devices, embedded controllers, management engines, or comparable system components from seizing control and altering, transmitting, or displaying any data. These entities are not connected by I/O, so blocking I/O directly does not provide enough protection.

In various embodiments, the lockdown UEFI firmware places the system in an inoperable (lockdown) state. Not having any I/O serves the following purposes:
1. prevents replacement of the lockdown UEFI firmware through normal means;
2. prevents users from changing any data inside the system; and
3. prevents users from getting any data out of the system.

Purpose #2 and #3 provide at least some of the inoperability features.

In various embodiments, access of any data in the system is prevented while in the lockdown state. The lockdown state involves preventing both users and the device from modifying or transmitting any data stored in the device.

A normal UEFI flash program is prevented from loading any other firmware. Only a predefined other capsule code is allowed to be loaded through a predefined, hardware-based method. Since the method is hardware based, a normal UEFI flash program will not work.

Figure 3:
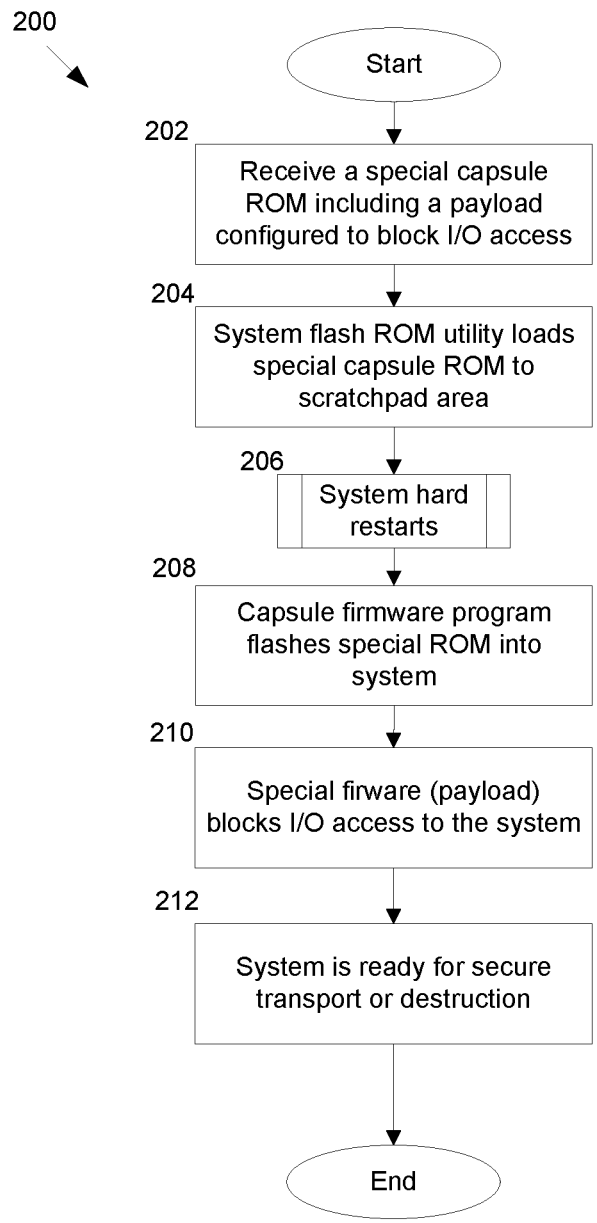
FIG. 3 is a schematic flow chart diagram illustrating one embodiment of a method for locking down of a system.

FIG. 3 is a schematic flow chart diagram illustrating an embodiment of a method 200 for enabling system lockdown. In some embodiments, the method 200 is performed by an apparatus, such as the computer system 100. In certain embodiments, the method 500 may be performed by a processor executing program code, for example, a microcontroller, a microprocessor, a CPU, a GPU, an auxiliary processing unit, a FPGA, or the like. At a block 202, a special capsule ROM including a payload configured to block I/O access is received at a computing system. At a block 204, a system flash ROM utility loads the special capsule ROM to a scratchpad area. At a block 206, a system hard restart is performed. At a block 208, a capsule firmware program flashes the special capsule ROM into the system. At a block 210, the special firmware (payload) included in the special capsule ROM blocks I/O access to the system. At a block 212, the locked down system is ready for transport or destruction.

Figure 4:
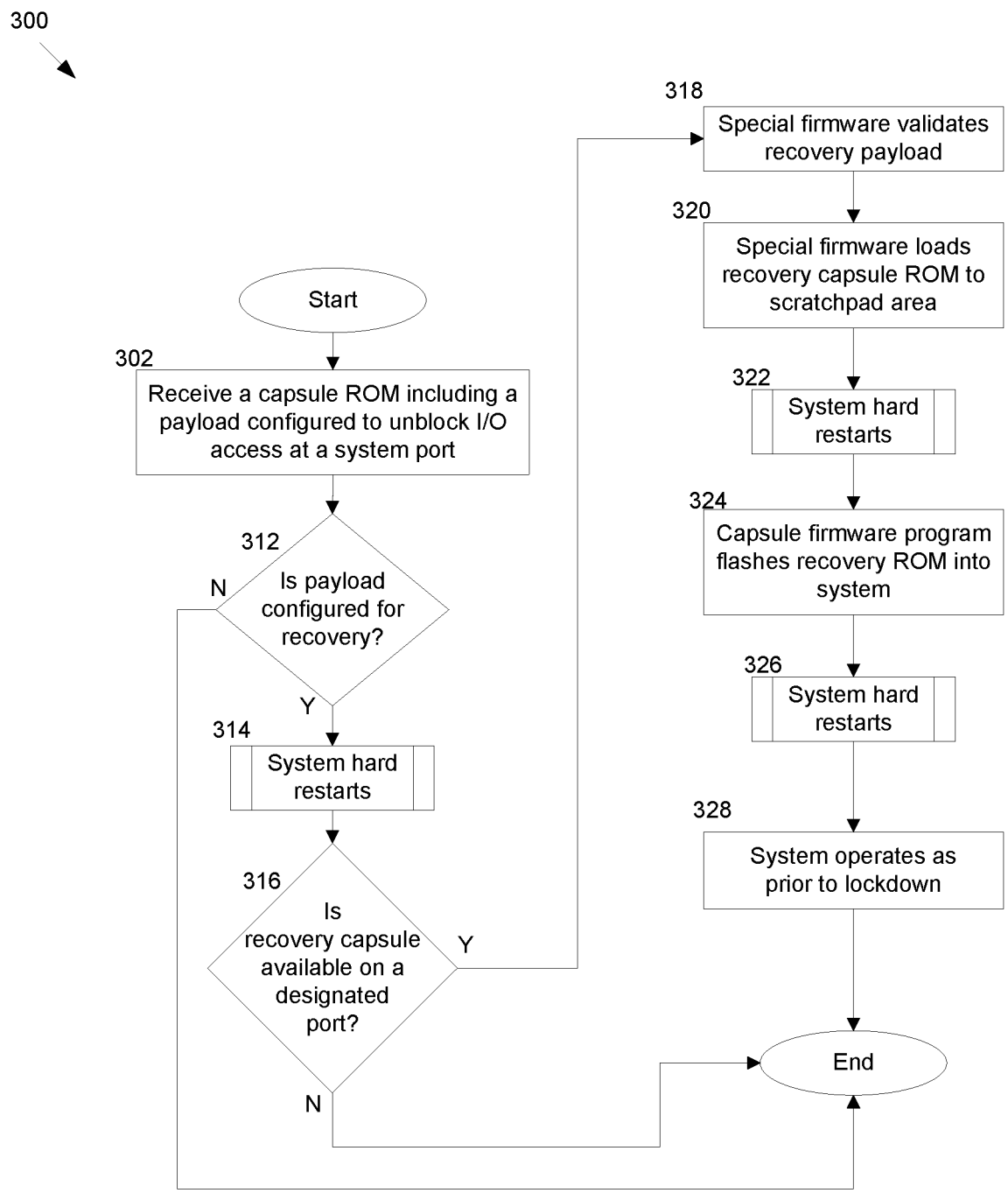
FIG. 4 is a schematic flow chart diagram illustrating one embodiment of a method for performing recovery of a locked down system.

FIG. 4 is a schematic flow chart diagram illustrating an embodiment of a method 300 for enabling system recovery after the lockdown that occurred in FIG. 3. At a block 302, an operator loads a recovery capsule ROM into a port of the system. At a block 312, the method 300 determines if the special firmware configured for recovery. At a block 314, a system hard restart is performed, if the method 300 determines that the special firmware is configured for recovery. At a block 316, after the restart of block 314, the method 300 determines if the recovery capsule is available on a previously designated port. At a block 318, special firmware validates recovery payload, if the method 300 determines that the recovery capsule ROM is available on the previously designated port. At a block 320, the special firmware (i.e., bootstrap code) loads the recovery capsule ROM to the scratchpad area. At a block 322, a system hard restart is performed. At a block 324, capsule firmware program flashes the recovery capsule ROM into the system. At a block 326, a system hard restart is performed. At a block 328, the system operates as prior to lockdown. In other words, the system returns to normal operations.

Embodiments

A. A Method Performed on a Computing System, the Method Comprising: receiving a special capsule read only memory (ROM) having a payload at the computing system; loading the special capsule ROM to a scratchpad area; performing a hard restart of the computing system; flashing the special capsule ROM into the computing system; executing the payload; and blocking predefined input/output (I/O) access to the computing system responsive to the executed payload.

B. The method of A, further comprising: determining that the received special capsule ROM is a recovery capsule ROM; and restoring normal operation of the computing system upon the recovery capsule ROM being flashed into the computing system.

C. The method of B, wherein determining comprises determining if the recovery capsule ROM was received at a previously designated port of the computing system.

D. The method of any of B or C, wherein determining comprises determining that the recovery capsule ROM was not received at a previously designated port of the computing system and blocking flashing of the special capsule ROM responsive to determining that the recovery capsule ROM was not received at the previously designated port.

E. The method of any of A-D, wherein flashing the capsule ROM includes manipulating version of basic input/output system (BIOS) firmware to be lower than a version associated with the capsule ROM.

F. The method of any of A-E, further comprising validating the payload based on previously created encryption keys.

G. The method of F, wherein the previously created encryption keys were previously generated by a manufacturer of the computing system.

H. The method of any of B-D, further comprising: creating encryption keys at time of lockdown; and validating the payload of the recovery capsule ROM based on the encryption keys.

I. A system comprising: a processor; and storage device configured to store machine-readable instructions, wherein execution of the machine-readable instructions that, when executed by the processor, cause the processor to: receive a special capsule read only memory (ROM) having a payload at the system; load the special capsule ROM to a scratchpad area; perform a hard restart of the system; flash the special capsule ROM into the system; execute the payload; and block predefined input/output (I/O) access to the system responsive to the executed payload.

J. The system of I, wherein the machine-readable instructions further cause the processor to: determine that the received special capsule ROM is a recovery capsule ROM; and restore normal operation of the system upon the recovery capsule ROM being flashed into the system.

K. The system of J, wherein the machine-readable instructions further cause the processor to determine if the recovery capsule ROM was received at a previously designated port of the system.

L. The system of J or K, wherein the machine-readable instructions further cause the processor to determine that the recovery capsule ROM was not received at a previously designated port of the system and blocking flashing of the special capsule ROM responsive to determining that the recovery capsule ROM was not received at the previously designated port.

M. The system of any of I-L, wherein the machine-readable instructions further cause the processor to manipulate version of basic input/output system (BIOS) firmware to be lower than a version associated with the capsule ROM.

N. The system of any of I-M, wherein the machine-readable instructions further cause the processor to validate the payload based on previously created encryption keys.

O. The system of N, wherein the previously created encryption keys were previously generated by a manufacturer of the system.

P. The system of any of J-L, wherein the machine-readable instructions further cause the processor to create encryption keys at time of lockdown and validate the payload of the recovery capsule ROM based on the encryption keys.

Q. A non-transitory computer-readable medium storing machine-readable instructions that, when executed by a processor, cause the processor to: establish a portion of the machine-readable instructions as sole controller of the system responsive to the machine-readable instructions; prevent unauthorized replacement of the machine-readable instructions; block user access to internal resources of the computing system; and prevent predefined input/output (I/O) of the computing system.

R. The non-transitory computer-readable medium of Q, wherein the machine-readable instructions further cause the processor to: replace previously stored instructions by a different, predefined set of machine-readable instructions through an authorized process internal to the system responsive to the machine-readable instructions.

S. The non-transitory computer-readable medium of Q or R, wherein the machine-readable instructions further cause the processor to: install the machine-readable instructions using a unified extensible firmware interface (UEFI) capsule update process.

T. The non-transitory computer-readable medium of any of Q-S, wherein the machine-readable instructions further cause the processor to: determine that the received special capsule ROM is an authorized recovery capsule ROM; and restore normal operation of the computing system upon the authorized recovery capsule ROM being flashed into the computing system.

U. The non-transitory computer-readable medium of any of T, wherein the machine-readable instructions further cause the processor to determine if the authorized recovery capsule ROM was received at a previously designated port of the computing system.

V. The non-transitory computer-readable medium of T or U, wherein the machine-readable instructions further cause the processor to determine that the authorized recovery capsule ROM was not received at a previously designated port of the computing system and blocking flashing of the special capsule ROM responsive to determining that the recovery capsule ROM was not received at the previously designated port.

W. The non-transitory computer-readable medium of any of Q-V, wherein the machine-readable instructions further cause the processor to manipulate version of basic input/output system (BIOS) firmware to be lower than a version associated with the capsule ROM.

X. The non-transitory computer-readable medium of any of Q-W, wherein the machine-readable instructions further cause the processor to validate the payload based on previously created encryption keys, wherein the previously created encryption keys were previously generated by a manufacturer of the computing system.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed on a computing system, the method comprising:
   receiving a special capsule read-only memory ("ROM") having a payload configured to block input/output (I/O) access, the payload comprising machine-readable instructions;
   loading the special capsule ROM to a scratchpad memory using a flash ROM utility of the computing system;
   performing a hard restart of the computing system;
   flashing the special capsule ROM;
   preventing unauthorized replacement of the machine-readable instructions;
   blocking user access to internal resources of the computing system; and
   preventing predefined input/output (I/O) of the computing system.

2. The method of claim 1, further comprising establishing a portion of the machine-readable instructions as a sole controller of the computing system responsive to the machine-readable instructions and replacing previously stored instructions by a different, predefined set of machine-readable instructions through an authorized process internal to the computing system responsive to the machine-readable instructions.

3. The method of claim 2, further comprising:
   creating encryption keys at time of blocking predefined input/output (I/O) access; and
   validating the payload of a recovery capsule ROM based on the encryption keys.

4. The method of claim 1, further comprising installing the machine-readable instructions using a unified extensible firmware interface (UEFI) capsule update process.

5. The method of claim 1, further comprising:
   determining that the received special capsule ROM is an authorized recovery capsule ROM; and
   restoring normal operation of the computing system upon the authorized recovery capsule ROM being flashed into the computing system.

6. The method of claim 5, wherein the determining comprises determining if the authorized recovery capsule ROM is available at a previously designated port of the computing system.

7. The method of claim 1, further comprising validating the payload based on previously created encryption keys, wherein the previously created encryption keys were generated by a manufacturer of the computing system.

8. A system comprising:
   a processor; and
   a storage device configured to store machine-readable instructions that, when executed by the processor, cause the processor to:
   receive a special capsule read-only memory ("ROM") having a payload configured to block input/output (I/O) access;
   load the special capsule ROM to a scratchpad memory using a flash ROM utility of the system;
   perform a hard restart of the system;
   flash the special capsule ROM;
   prevent unauthorized replacement of the machine-readable instructions;
   block user access to internal resources of the system; and
   prevent predefined input/output (I/O) of the system.

9. The system of claim 8, wherein the machine-readable instructions further cause the processor to establish a portion of the machine-readable instructions as a sole controller of the system responsive to the machine readable instructions and replace previously stored instructions by a different, predefined set of machine-readable instructions through an authorized process internal to the system responsive to the machine-readable instructions.

10. The system of claim 8, wherein the machine-readable instructions further cause the processor to install the machine-readable instructions using a unified extensible firmware interface (UEFI) capsule update process.

11. The system of claim 8, wherein the machine-readable instructions further cause the processor to:
   determine that the received special capsule ROM is an authorized recovery capsule ROM; and
   restore normal operation of the system upon the authorized recovery capsule ROM being flashed into the system.

12. The system of claim 11, wherein the machine-readable instructions further cause the processor to determine if the authorized recovery capsule ROM is available at a previously designated port of the system.

13. The system of claim 8, wherein the machine-readable instructions further cause the processor to validate the payload based on previously created encryption keys.

14. The system of claim 13, wherein the previously created encryption keys were previously generated by a manufacturer of the system.

15. A non-transitory computer-readable medium storing machine-readable instructions that, when executed by a processor of a computing system, cause the processor to:

receive a special capsule read-only memory ("ROM") having a payload configured to block input/output (I/O) access, the payload comprising machine-readable instructions;
load the special capsule ROM to a scratchpad memory using a flash ROM utility of the computing system;
perform a hard restart of the computing system;
flash the special capsule ROM;
prevent unauthorized replacement of the machine-readable instructions;
block user access to internal resources of the computing system; and
prevent predefined input/output (I/O) of the computing system.

16. The non-transitory computer-readable medium of claim 15,
wherein the machine-readable instructions further cause the processor to establish a portion of the machine-readable instructions as a sole controller of the computing system responsive to the machine-readable instructions and replace previously stored instructions by a different, predefined set of machine-readable instructions through an authorized process internal to the computing system responsive to the machine-readable instructions.

17. The non-transitory computer-readable medium of claim 15, wherein the machine-readable instructions further cause the processor to install the machine-readable instructions using a unified extensible firmware interface (UEFI) capsule update process.

18. The non-transitory computer-readable medium of claim 15,
wherein the machine-readable instructions further cause the processor to:
determine that the loaded special capsule ROM is an authorized recovery capsule ROM; and
restore normal operation of the computing system upon the authorized recovery capsule ROM being flashed into the computing system.

19. The non-transitory computer-readable medium of claim 18,
wherein the machine-readable instructions further cause the processor to determine if the authorized recovery capsule ROM is available at a previously designated port of the computing system.

20. The non-transitory computer-readable medium of claim 18,
wherein the machine-readable instructions further cause the processor to:
manipulate a version of basic input/output system (BIOS) firmware to be lower than a version associated with the recovery capsule ROM; and
validate the payload based on previously created encryption keys, wherein the previously created encryption keys were previously generated by a manufacturer of the computing system.

* * * * *